Patented Dec. 5, 1944

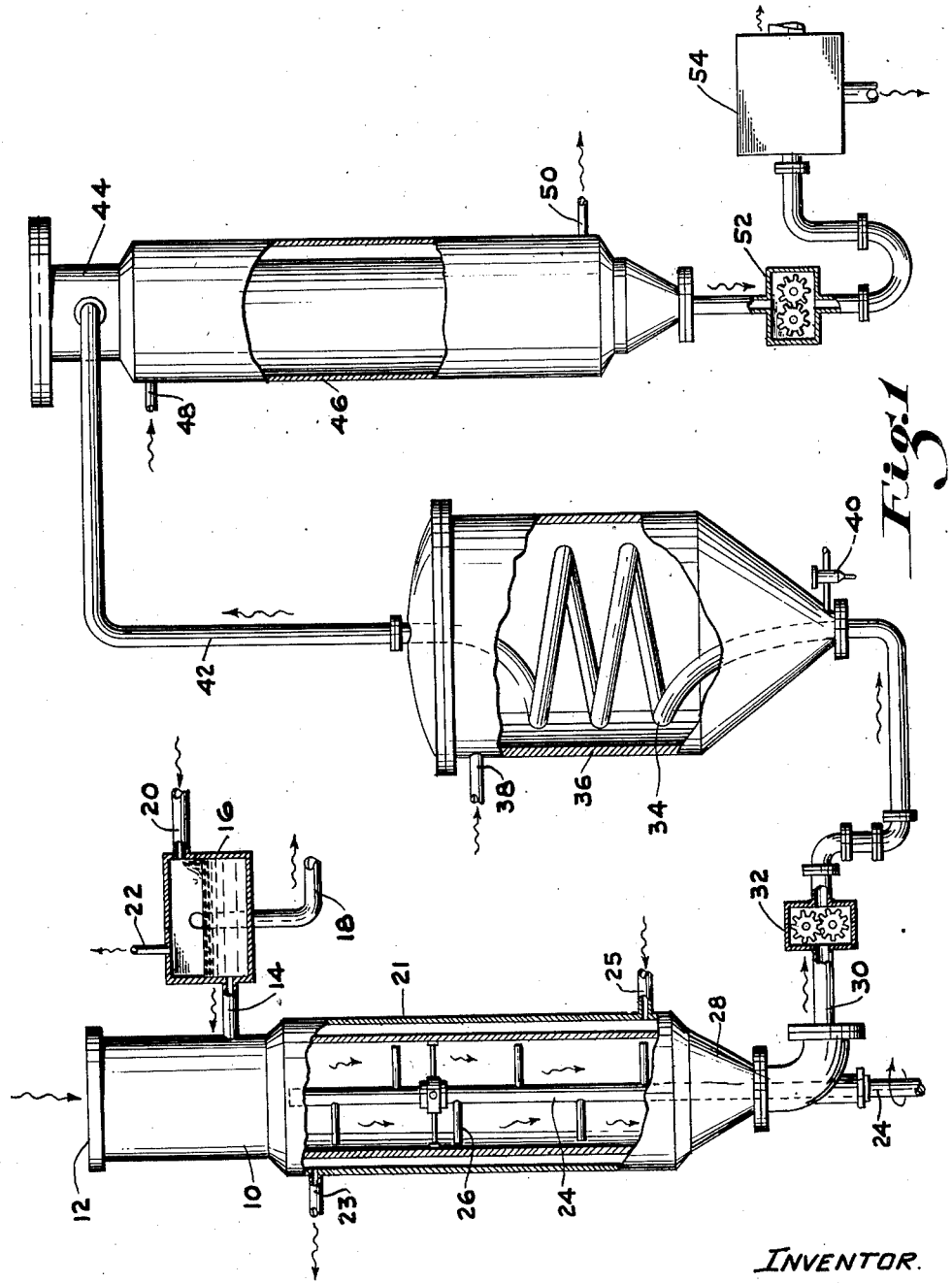

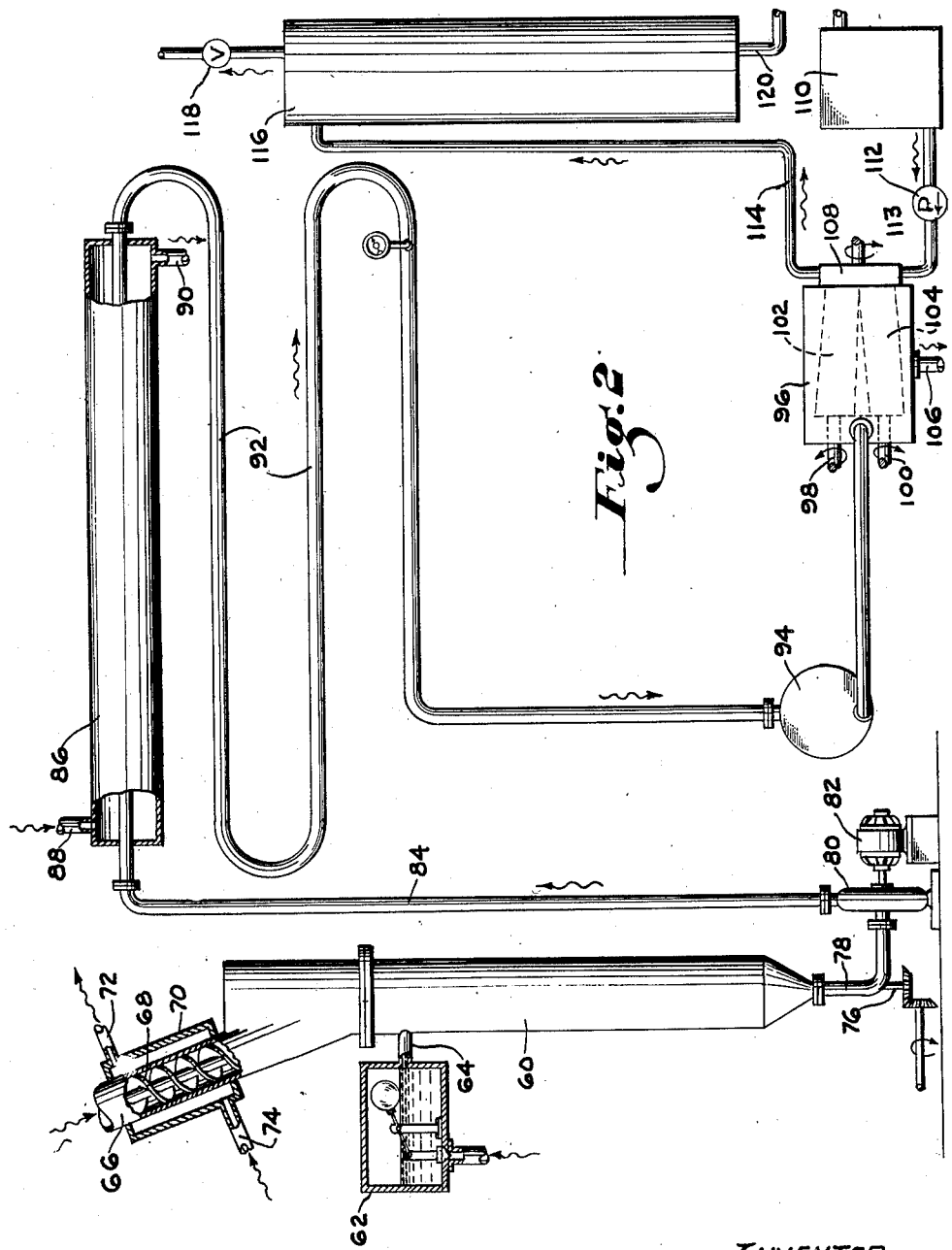

2,364,392

UNITED STATES PATENT OFFICE 2,364,392

PRODUCTION OF ALKALI METAL CELLULOSE XANTHATE

William Richard Schmitz, Jr., Richmond, Va., assignor to E. I. du Pont de Nemours & Company, Wilmington, Del., a corporation of Delaware Application October 17, 1942, Serial No. 462,433

14 Claims. (Cl. 260—216)

This invention relates to the production of alkali metal cellulose xanthate from alkali metal cellulose and carbon bisulfide.

Heretofore, the production of alkali metal cellulose xanthate has required extreme care and a great deal of time. For many years the conventional process for the production of alkali metal cellulose xanthate comprised the steps of mixing aged alkali metal cellulose in crumb form with a relatively small quantity of carbon bisulfide (from 10% to 40%, based on the weight of the dry cellulose). The volatility of the carbon bisulfide caused it to vaporize and diffuse through the alkali metal cellulose and gradually react therewith. The mixing operation was carried out over a period of from 1 to 3 hours before the reaction was complete. Furthermore, the uniformity of the resultant alkali metal cellulose xanthate was largely dependent upon such factors as the free alkali content of and the degree and type of shredding of the alkali metal cellulose.

It is an object of the present invention to produce alkali metal cellulose xanthate in a relatively short period of time.

It is another object of this invention to produce alkali metal cellulose xanthate in a relatively short period of time in a continuous manner and with a relatively small amount of equipment.

It is still another object of this invention to produce alkali metal cellulose xanthate of uniform quality by a process which is independent of various factors which have heretofore critically influenced the uniformity of quality.

Other objects of the invention will appear hereinafter.

The objects of the invention may be accomplished, in general, by mixing alkali metal cellulose with a sufficient quantity of liquid carbon bisulfide to form a liquid slurry, and permitting the slurry components to react to form the alkali metal cellulose xanthate.

The present invention will be more readily understood by referring to the following detailed description when taken in connection with the accompanying illustrations, in which;

Figure 1 is a diagrammatic side elevational view, with parts shown in section, of one embodiment of apparatus suitable for use in carrying out the present invention.

Figure 2 is a diagrammatic side elevational view, with parts shown in section, of another embodiment of the invention.

Referring to Figure 1 of the drawings, reference numeral 10 designates a mixing receptacle comprising an inlet opening 12 for alkali cellulose and an inlet 14 for carbon bisulfide. The carbon bisulfide inlet 14 is connected to a constant level device 16 comprising an over-flow conduit 18, a constant flow supply 20 and a gas vent 22. The mixing receptacle is provided with means for stirring the mass, said means comprising a rotatable shaft 24 and horizontal spikes or paddles 26 connected to the shaft. An outlet opening 28 for the slurry mass is provided at the bottom of the receptacle 10. The receptacle is provided with a cooling jacket 21 comprising an inlet opening 25 for a cooling medium such as a brine solution, and an outlet 23. The slurry outlet 28 is connected to a conduit 30, which in turn is connected to a slurry pump 32. The outlet side of the pump 32 is connected to a heating coil 34 contained in a heat exchanger casting 36. Steam, or other heating medium may be maintained about the coil 34 by passing the heating medium into the casing 36 through inlet conduit 38, and the steam and condensed water may be removed through steam trap 40. The heating coil 34, is connected to conduit 42 which leads to a time lag reaction chamber 44. The chamber 44 is provided with a heating jacket 46 having an inlet opening 48 and an outlet opening 50 through which a heating element, such as steam, may be passed. The chamber 44 is provided with an outlet for the reacted slurry at the bottom thereof, said outlet being connected to a second pump 52. The outlet and pump 52 may be connected to means 54 for separating the solid from the liquid components of the slurry.

The apparatus shown in Figure 1 operates substantially as follows:

Alkali cellulose, which may be in a shredded form or in pressed sheet form, is fed into the mixing receptacle 10 through the inlet opening 12. Liquid carbon bisulfide is continuously passed into the receptacle 10 and is maintained therein at a given level by means of the constant level device 16. The shaft 24 is rotated causing the alkali cellulose to be broken up in the liquid carbon bisulfide to form a liquid slurry thereof. If desired, the temperature of the slurry mass may be maintained substantially constant by passing a cooling medium through the cooling jacket 21. The resulting slurry is continuously passed from the bottom of the receptacle through outlet 28 and is pumped through heating coil 34 by means of pump 32. The slurry is continuously passed through the heating coil and through the conduit 42, into reaction chamber 44. As the material passes through the heating coil 34, it will be heated substantially to the desired temperature at which the reaction is to be carried out. The reaction continues in the reaction chamber 44 and is substantially complete when it is withdrawn from the bottom of the reaction chamber 44 by means of pump 52. The slurry will now consist of particles of alkali metal cellulose xanthate in liquid carbon bisulfide. During the period of the reaction in chamber 44, the slurry may be maintained at the desired reaction temperature by passing a heating medium through the heating jacket 46. It is highly desirable that the slurry be maintained under a pressure exceeding the vapor pressure of the carbon bisulfide at the highest temperature reached in the heating coil 34 or the reaction chamber 44. This is accomplished by running pump 52 with a lower volume rate than pump 32 to permit maintenance of the proper pressure between the two pumps. The slurry is pumped from receptacle 44 into any desired means for separating the solid from the liquid components of the slurry. The resulting compacted alkali metal cellulose xanthate may then be dissolved in an aqueous sodium hydroxide solution for the production of viscose.

Referring to Figure 2 of the drawings, reference numeral 60 designates a mixing receptacle into which alkali metal cellulose and carbon bisulfide are fed and mixed to form a slurry. The alkali metal cellulose may be fed into the receptacle 60 by means of a screw feed 68 positioned in conduit 66. If desired, the alkali metal cellulose may be cooled to any desired temperature by means of cooling jacket 70 provided with inlet opening 74 and outlet opening 72. The carbon bisulfide is passed into the mixing receptacle through inlet conduit 64 which is connected to a constant level device 62 comprising a conventional constant level float control mechanism. The mixing in the receptacle 60 is carried out similarly to that shown in the mixing receptacle 10 of Figure 1 and comprising a rotatable shaft 76 which on the interior of the receptacle has mixing paddles connected thereto. The slurry mass is removed from mixing receptacle 60 through conduit 78 and is passed into conduit 84 by means of pump 80 which may be driven in any desired manner, for example, by motor 82. The slurry is passed from conduit 84 through a heat exchanger 86 and then through time lag reaction coil 92. The heat exchanger 86 comprises a heating jacket, and inlet 88 and outlet 90 for passing a fluid heating means about a conduit through which the slurry passes. The reaction coil 92 will be of sufficient length to substantially complete the xanthation reaction. From the coil 92 the slurry passes into a screw press 96. The slurry is forced into the screw press by means of pump 94.

In the present instance, as in the apparatus shown in Figure 1, the slurry passing through conduit 84, heat exchanger 86 and reaction coil 92 is maintained under pressure exceeding the vapor pressure of the carbon bisulfide at the highest temperature of reaction employed. This is accomplished by a differential in volume rate in pumps 80 and 94. The screw press is preferably of the type described and claimed in my copending application Serial No. 466,810 filed November 24, 1942, and comprises screw drive shafts 98 and 100 and intermeshing screws 102 and 104. The liquid carbon bisulfide is removed at outlet 106. Such a screw press will forward the slurry in a positive manner and remove the liquid carbon bisulfide from the solid alkali metal cellulose xanthate with a definite compression ratio.

The carbon bisulfide in such a device is preferably withdrawn under a certain amount of vacuum so as to cause a material cooling of the alkali metal cellulose passing through the press. Furthermore, the press will compact the cellulose xanthate to remove any entrained air therefrom and forward the compacted cellulose xanthate to a cutting and dissolving mechanism 108 positioned on the outlet end of the screw press. The compacted cellulose xanthate is cut into fine ribbons which are quickly dissolved by passing a sodium hydroxide solution through the cutting device 108 by means of pump 112 and inlet and outlet conduits 113 and 114. The resulting viscose solution, containing a certain amount of free carbon bisulfide is passed from the outlet conduit to a settling tank 116. The settling tank is maintained under vacuum by means of pump 118 for the removal of residual free carbon bisulfide. The completed viscose is removed from the tank 116 through outlet conduit 120. From the above, it will be apparent that the apparatus shown in Figure 2 operates in substantially the same manner as the apparatus shown in Figure 1.

As above described, it is preferred that the slurry, during the reaction of its components, is maintained under an elevated temperature. This is not essential however, for the operativeness of the process. Naturally, if the slurry is not heated to an elevated temperature during the reaction of the components thereof, the period of the reaction will be considerably longer and the apparatus will obviously have to be designed to move at a much lower rate.

As above indicated with reference to the description of the drawings, it is preferred that the reacted slurry mass comprising particles of alkali metal cellulose xanthate in carbon bisulfide be first subjected to mechanical separation of the solid from the liquid components of the slurry. This again is not essential to the operativeness of the process. The entire reacted slurry mass may immediately be dissolved in an aqueous solution of sodium hydroxide and the carbon bisulfide subsequently removed from the mass.

As above stated, the carbon bisulfide must be added in sufficient amounts to produce a liquid slurry which may be moved through the system as above described. It has been found that the addition of carbon bisulfide in an amount of at least 4 times the weight of the alkali metal cellulose will be sufficient to produce a slurry mass. The carbon bisulfide may be present in considerably greater amounts, but preferably the carbon bisulfide is added in amounts from 6–10 times the weight of the alkali metal cellulose.

The slurry, during the reaction, is preferably maintained at a temperature between 45° C. and 110° C. By maintaining the temperature between these limits, it is possible to carry out the xanthation reaction in a period from 1–20 minutes. Prior to the present invention, it was considered necessary to carry out the xanthation reaction in a period from 1–3 hours.

The reacted slurry mass, preferably during the period of separation of the solid from the liquid components thereof, is cooled to a temperature of between 15° C. and 30° C.

In accordance with the process of the present invention, it is possible to produce a constant and uniform alkali metal cellulose xanthate in an exceedingly short period of time. The process of the present invention is not dependent upon the type and degree of shredding of the alkali metal cellulose as in previously known processes.

The process of the present invention permits the xanthation reaction to be carried out in a continuous manner at a comparatively high rate of speed with a short reaction time and thereby materially decreases the cost of investment in apparatus and operating costs. By the present invention, the xanthation reaction between alkali metal cellulose and carbon bisulfide is controlled solely by factors of time and temperature.

Since it is obvious that many changes and modifications may be made in the specific details above described without departing from the nature and spirit of the invention, it is to be understood that the invention is not to be limited to the above described details except as set forth in the appended claims.

I claim:

1. A process for the production of alkali metal cellulose xanthate which comprises mixing alkali metal cellulose in solid form with at least 4 times its weight of liquid carbon bisulfide to form a liquid slurry.

2. A process for the production of alkali metal cellulose xanthate which comprises mixing alkali metal cellulose in solid form with at least 4 to 10 times its weight of liquid carbon bisulfide to form a liquid slurry.

3. A process for the production of alkali metal cellulose xanthate which comprises mixing alkali metal cellulose with a sufficient quantity of liquid carbon bisulfide to form a liquid slurry, and heating said slurry to a temperature of between 45° C. and 110° C. while maintaining the same under a pressure exceeding the vapor pressure of the carbon bisulfide at the highest temperature to which the slurry is heated whereby to form a slurry of alkali metal cellulose xanthate in liquid carbon bisulfide.

4. A process for the production of alkali metal cellulose xanthate which comprises mixing alkali metal cellulose with at least 4 times its weight of liquid carbon bisulfide to form a slurry, and heating said slurry to a temperature of between 45° C. and 110° C. while maintaining the same under a pressure exceeding the vapor pressure of the carbon bisulfide at the highest temperature to which the slurry is heated whereby to form a slurry of alkali metal cellulose xanthate in liquid carbon bisulfide.

5. A process for the production of alkali metal cellulose xanthate which comprises mixing alkali metal cellulose with at least 4 to 10 times its weight of liquid carbon bisulfide to form a liquid slurry, and heating said slurry to a temperature of between 45° C. and 110° C. while maintaining the same under a pressure exceeding the vapor pressure of the carbon bisulfide at the highest temperature to which the slurry is heated whereby to form a slurry of alkali metal cellulose xanthate in liquid carbon bisulfide.

6. A process for the production of alkali metal cellulose xanthate which comprises mixing alkali metal cellulose with a sufficient quantity of liquid carbon bisulfide to form a liquid slurry, heating said slurry to a temperature of between 45° C. and 110° C. while maintaining the same under a pressure exceeding the vapor pressure of the carbon bisulfide at the highest temperature to which the slurry is heated whereby to form a slurry of alkali metal cellulose xanthate in liquid carbon bisulfide, and removing at least a part of the unreacted carbon bisulfide.

7. A process for the production of alkali metal cellulose xanthate which comprises mixing alkali metal cellulose with a sufficient quantity of liquid carbon bisulfide to form a liquid slurry, heating said slurry to a temperature of between 45° C. and 110° C. while maintaining the same under a pressure exceeding the vapor pressure of the carbon bisulfide at the highest temperature to which the slurry is heated whereby to form a slurry of alkali metal cellulose xanthate in liquid carbon bisulfide, removing at least a part of the unreacted carbon bisulfide and cooling the alkali metal cellulose xanthate.

8. A process for the production of alkali metal cellulose xanthate which comprises mixing alkali metal cellulose with a sufficient quantity of liquid carbon bisulfide to form a liquid slurry, heating said slurry to a temperature of between 45° C. and 110° C. while maintaining the same under a pressure exceeding the vapor pressure of the carbon bisulfide at the highest temperature to which the slurry is heated whereby to form a slurry of alkali metal cellulose xanthate in liquid carbon bisulfide, removing at least a part of the unreacted carbon bisulfide, and cooling to a temperature of between 15° C. and 30° C.

9. A process for the production of alkali metal cellulose xanthate which comprises mixing alkali metal cellulose with a sufficient quantity of liquid carbon bisulfide to form a liquid slurry, heating said slurry to a temperature of between 45° C. and 110° C. while maintaining the same under a pressure exceeding the vapor pressure of the carbon bisulfide at the highest temperature to which the slurry is heated whereby to form a slurry of alkali metal cellulose xanthate in liquid carbon bisulfide, removing at least a part of the unreacted carbon bisulfide, and dissolving the alkali metal cellulose xanthate in an aqueous solution of sodium hydroxide.

10. A process for the production of alkali metal cellulose xanthate which comprises mixing alkali metal cellulose with a sufficient quantity of liquid carbon bisulfide to form a liquid slurry, heating said slurry to a temperature of between 45° C. and 110° C. while maintaining the same under a pressure exceeding the vapor pressure of the carbon bisulfide at the highest temperature to which the slurry is heated whereby to form a slurry of alkali metal cellulose xanthate in liquid carbon bisulfide, removing at least a part of the unreacted carbon bisulfide, cooling to a temperature of between 15° C. and 30° C., and dissolving the xanthate in an aqueous solution of sodium hydroxide.

11. A process for the production of alkali metal cellulose xanthate which comprises mixing alkali metal cellulose with a sufficient quantity of liquid carbon bisulfide to form a liquid slurry, heating said slurry to a temperature of between 45° C. and 110° C. while maintaining the same under a pressure exceeding the vapor pressure of the carbon bisulfide at the highest temperature to which the slurry is heated whereby to form a slurry of alkali metal cellulose xanthate in liquid carbon bisulfide, removing at least a part of the unreacted carbon bisulfide, cooling to a temperature of between 15° C. and 30° C., dissolving the xanthate in an aqueous solution of sodium hydroxide, and imparting a vacuum to said solution whereby to remove remaining quantities of free carbon bisulfide.

12. A continuous process for the production of alkali metal cellulose xanthate which comprises continuously mixing alkali metal cellulose with liquid carbon bisulfide in such amount as to form a liquid slurry, continuously pumping said slurry through a reaction zone whereby to form a slurry of particles of alkali metal cellulose xanthate in liquid carbon bisulfide.

13. A continuous process for the production of alkali metal cellulose xanthate which comprises continuously mixing alkali metal cellulose with liquid carbon bisulfide in such amount as to form a liquid slurry, continuously pumping said slurry through a reaction zone whereby to form a slurry of particles of alkali metal cellulose xanthate in liquid carbon bisulfide, and continuously separating said carbon bisulfide from said particles of alkali metal cellulose xanthate.

14. A liquid slurry comprising particles of alkali metal cellulose xanthate and 4 to 10 times its weight of liquid carbon bisulfide.

WILLIAM R. SCHMITZ, JR.